(12) United States Patent
Langworthy et al.

(10) Patent No.: US 6,484,481 B1
(45) Date of Patent: Nov. 26, 2002

(54) ROTARY CUTTING UNIT WITH OVATE ROLLERS AND FRONT CORNER CUT-OUTS

(75) Inventors: Thomas F. Langworthy, Belle Plaine, MN (US); Daniel M. Treu, Eagan, MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/489,180

(22) Filed: Jan. 21, 2000

Related U.S. Application Data

(60) Provisional application No. 60/011,450, filed on Feb. 9, 1996.

(51) Int. Cl.⁷ .............................................. A01D 75/30
(52) U.S. Cl. .................................................. 56/6; 56/15.5
(58) Field of Search ...................... 56/6, 12.7, 255, 56/295, 17.4, 320.1, 320.2, 7, 249, 294, 252, 253, 15.2, 15.5, 14.9, 15.7; D15/17

(56) References Cited

U.S. PATENT DOCUMENTS

| | | | | |
|---|---|---|---|---|
| 2,578,880 A | * | 12/1951 | Doyle | 56/17.2 |
| 2,731,007 A | * | 1/1956 | Benson | 123/185.1 |
| 2,968,906 A | | 1/1961 | Grimes | |
| 2,972,218 A | | 2/1961 | Benson | |
| 3,028,717 A | * | 4/1962 | West | 56/10.5 |
| D208,364 S | * | 8/1967 | Coss | D15/17 |
| 3,496,707 A | * | 2/1970 | Kobey | 56/17.5 |
| 3,680,295 A | * | 8/1972 | Rutherford | 56/320.2 |
| 4,378,668 A | * | 4/1983 | Gullett | 56/12.7 |
| 4,466,235 A | * | 8/1984 | Cole | 56/16.9 |
| 5,117,616 A | * | 6/1992 | McLane | 56/175 |
| 5,133,176 A | | 7/1992 | Baumann et al. | |
| 5,195,311 A | * | 3/1993 | Holland | 56/320.2 |
| 5,465,564 A | * | 11/1995 | Koehn et al. | 56/320.2 |
| 5,553,445 A | * | 9/1996 | Lamb et al. | 56/7 |
| 5,845,475 A | * | 12/1998 | Busboom et al. | 56/320.1 |
| 6,032,441 A | * | 3/2000 | Gust et al. | 56/7 |
| 6,047,530 A | | 4/2000 | Bednar | |

FOREIGN PATENT DOCUMENTS

AU 13463/70 4/1969

OTHER PUBLICATIONS

1990 Toro Wheel Horse Lawn Tractors and Riding Mowers brochure, Date 1990.
Nunes Rotary Mower brochure, Jun. 1993.

* cited by examiner

*Primary Examiner*—Robert E. Pezzuto
*Assistant Examiner*—Árpád Fábián Kovács
(74) *Attorney, Agent, or Firm*—James W. Miller

(57) ABSTRACT

A mower includes a plurality of cutting units carried on a traction vehicle in a staggered and overlapped orientation to provide a cutting swath. The cutting units are rotary type cutting units having cut-outs at each front corner thereof to eliminate or reduce streaking between adjacent cutting units. In addition, each cutting unit has two spaced, ovately shaped ground engaging rollers adjacent each front corner. The ovately shaped rollers are positioned so that a tapered outer end of each roller points to the outside of the cutting unit with the broader, basal end of the roller being positioned closer to the longitudinal centerline of the cutting unit. Such rollers support the front of the cutting unit and allow the front of the cutting unit to roll over the ground.

13 Claims, 9 Drawing Sheets

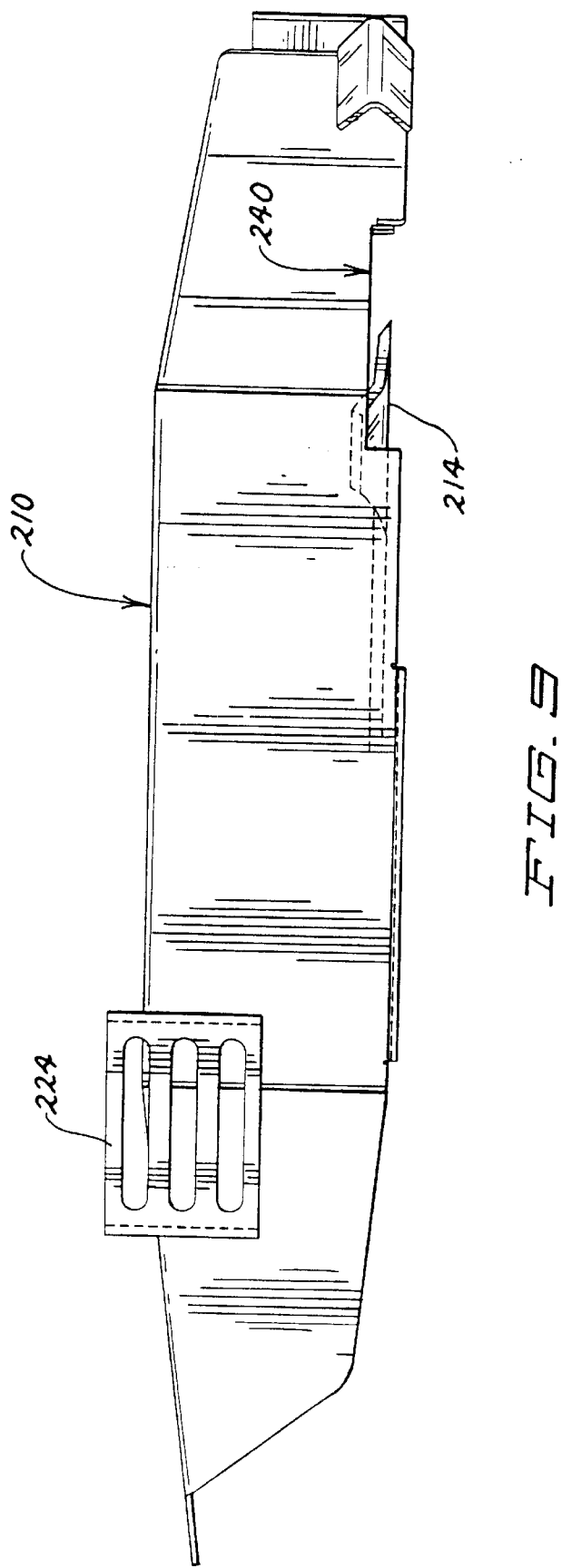

ROTARY CUTTING UNIT WITH OVATE ROLLERS AND FRONT CORNER CUT-OUTS

This application is claims the benefit of Ser. No. 60/011,450, filed Feb. 9, 1996.

TECHNICAL FIELD

This invention relates to a rotary cutting unit for use on a mower, preferably a mower in which a plurality of spaced and staggered cutting units collectively cut a swath of grass as the riding mower is operated.

BACKGROUND OF THE INVENTION

Riding mowers are known which carry a plurality of rotary cutting units for cutting a relatively wide swath of grass. For example, the Ransomes AR 250 is a five-plex rotary mower having three, front rotary cutting units arranged in a first row and two, rear rotary cutting units arranged in a second row. The front rotary cutting units are arranged in advance of the front wheels of the mower while the rear rotary cutting units are arranged between the front and rear wheels of the mower. The rear cutting units are further arranged to cover the gaps between the front cutting units. Thus, as the mower is driven forwardly and the cutting units are operated, the five cutting units cut a single swath of grass.

While such cutting units are effective in cutting a relatively wide swath of grass with each pass, the cut grass swath exhibits streaking, at least in certain grass conditions. Such streaking comprises a row or streak of uncut grass or of grass that is not cut as evenly and uniformly as the rest of the grass in the cut path. The Applicant has noticed such streaking occurring between the multiple rotary cutting units in a mower of this type, especially when the mower is turning or is traversing slopes. The streaks often occur generally along the line where one side of one of the front cutting units overlaps with a side of one of the rear cutting units. The presence of such streaks is obviously not aesthetically pleasing and is a disadvantage to such a mower having rotary cutting units.

Each cutting unit in a mower of this type carries a combination of rollers and wheels for allowing the cutting unit to roll over the ground as the mower moves forwardly. In the known Ransomes AR 50 mower, each cutting unit is supported at the rear by a full length rear roller. At the front, each cutting unit is supported by two caster wheels adjacent the front corners of the unit. The caster wheels are supported for turning about vertical pivots in a well known manner.

While the caster wheel/rear roller structure adequately supports the cutting unit for rolling on the ground, the use of caster wheels has some disadvantages. In order to support the caster wheels for free pivoting about their vertical pivots, the wheels must be set fairly far forwardly of the front of the cutting unit to allow for mounting of the pivot structure and to allow the caster wheels to swing about their vertical pivots without hitting the front of the unit. Mounting the caster wheels far enough forwardly to allow for proper pivoting of the wheels hinders or interferes with the ability of the unit to follow the ground contour and puts the support provided by the front caster wheels further forwardly relative to the blade than would be desirable. A more compact way of supporting the front of the cutting unit for rolling over the ground would be advantageous.

SUMMARY OF THE INVENTION

One aspect of this invention is directed to reducing or eliminating streaking between adjacent cutting units. This aspect is provided in a mower which comprises a traction vehicle. A plurality of cutting units are carried on the traction vehicle which cutting units collectively cut a swath of grass as the traction vehicle is operated. The cutting units comprise rotary-type cutting units each having at least one cutting blade which is rotated in a substantially horizontal cutting plane. In addition, the cutting units each include a cutting deck which includes cut-outs at each front corner thereof in which the cutting blade is exposed to uncut grass approaching each front corner of each cutting deck.

Another aspect of this invention relates to ground engaging rollers for the cutting deck. This aspect is provided in a mower comprising a traction vehicle. At least one cutting unit is carried on the traction vehicle. At least two ground engaging rollers are carried on the cutting unit with the rollers being laterally spaced apart relative to one another. Each roller has an ovate shape.

BRIEF DESCRIPTION OF THE DRAWINGS

This invention will be described hereafter in the Detailed Description, taken in conjunction with the following drawings, in which like reference numerals refer to like elements or parts throughout.

FIG. 9 is a side elevational view of the cutting deck portion, shown in FIG. 6, of the cutting unit, with the baffles having been removed from this view to better illustrate one of the front corner cut-outs of the cutting deck.

DETAILED DESCRIPTION

Figure 1:
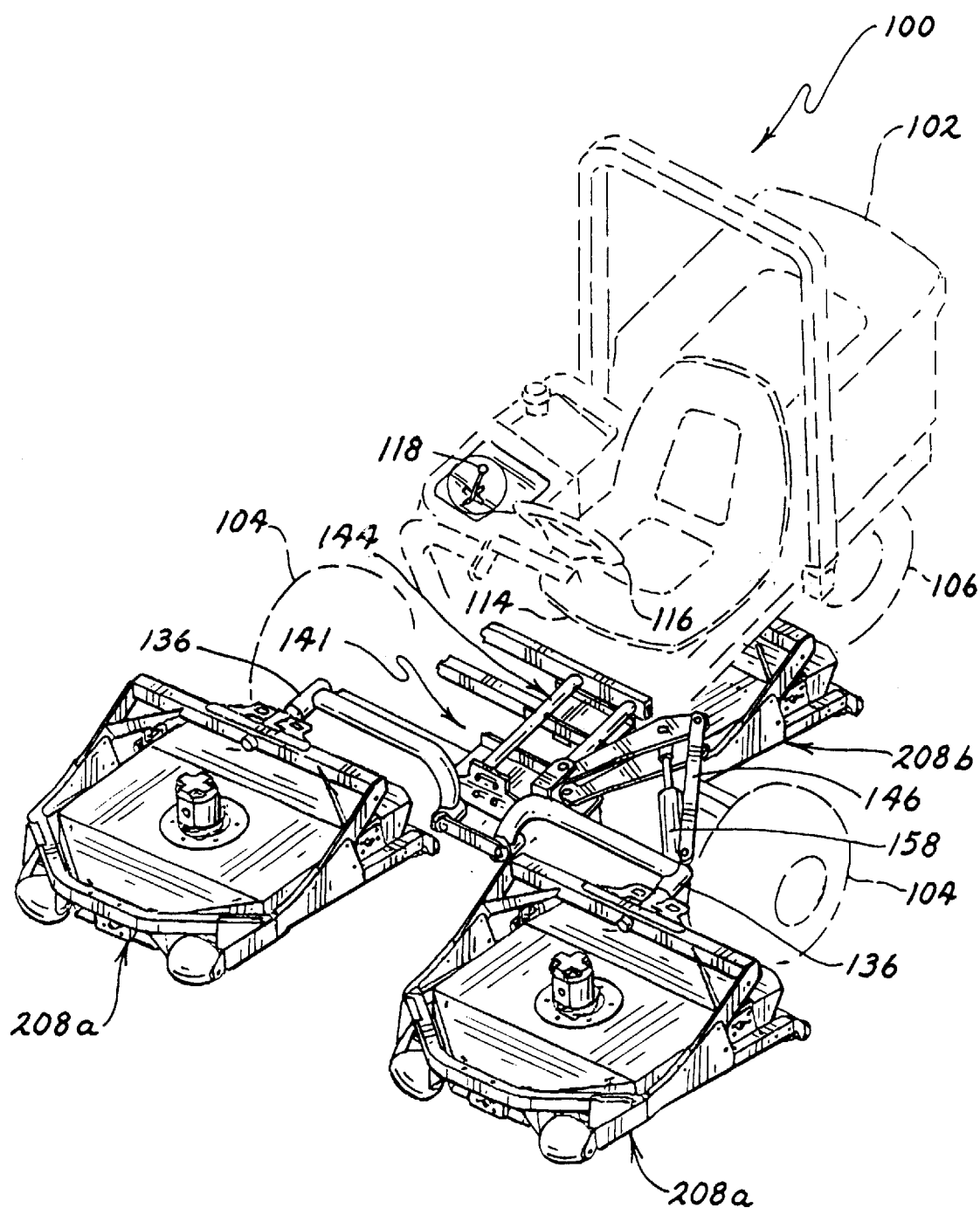
FIG. 1 is a perspective view of a mower according to the invention.
Figure 2:
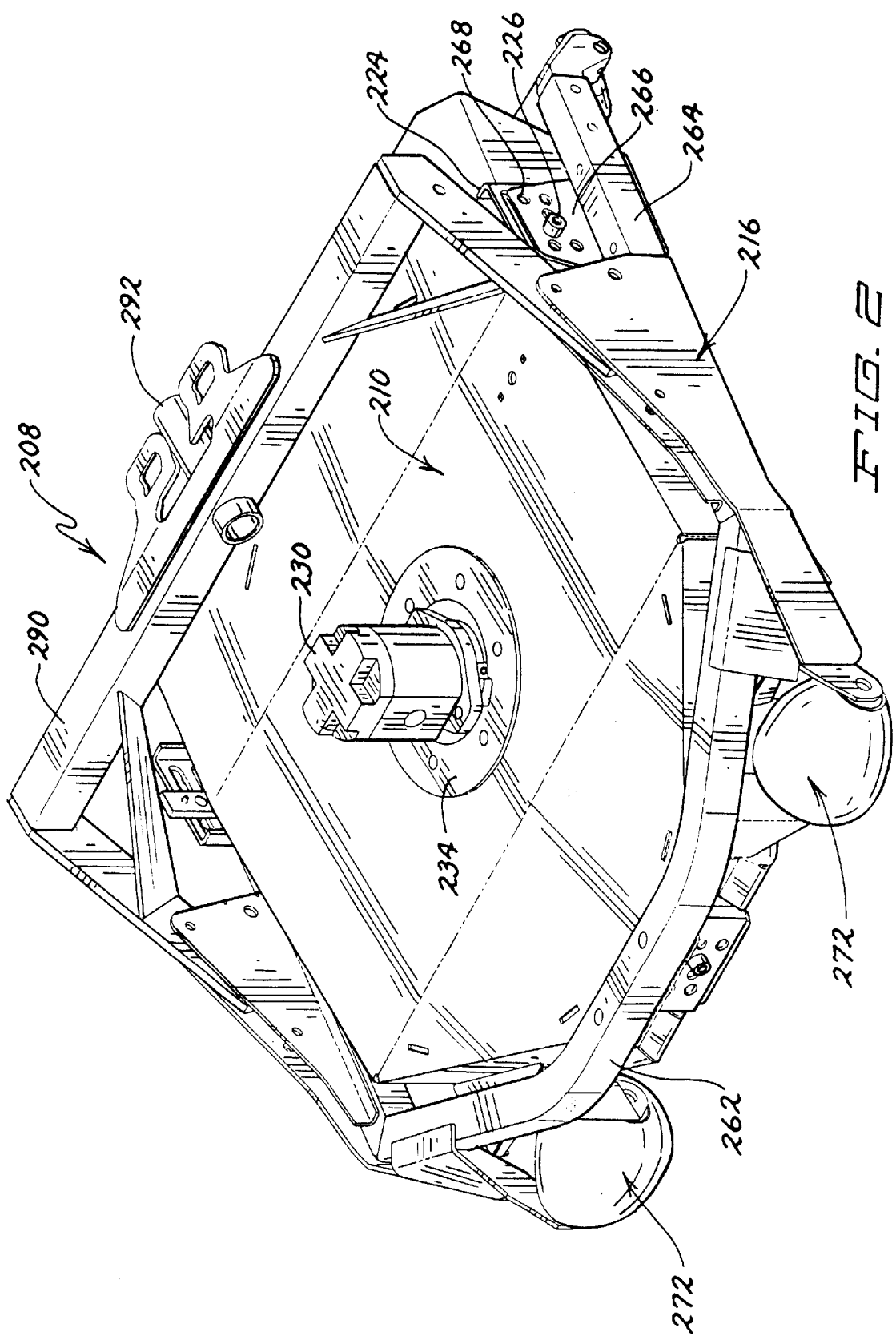
FIG. 2 is a perspective view of a rotary cutting unit used on the mower of FIG. 1.
Figure 3:
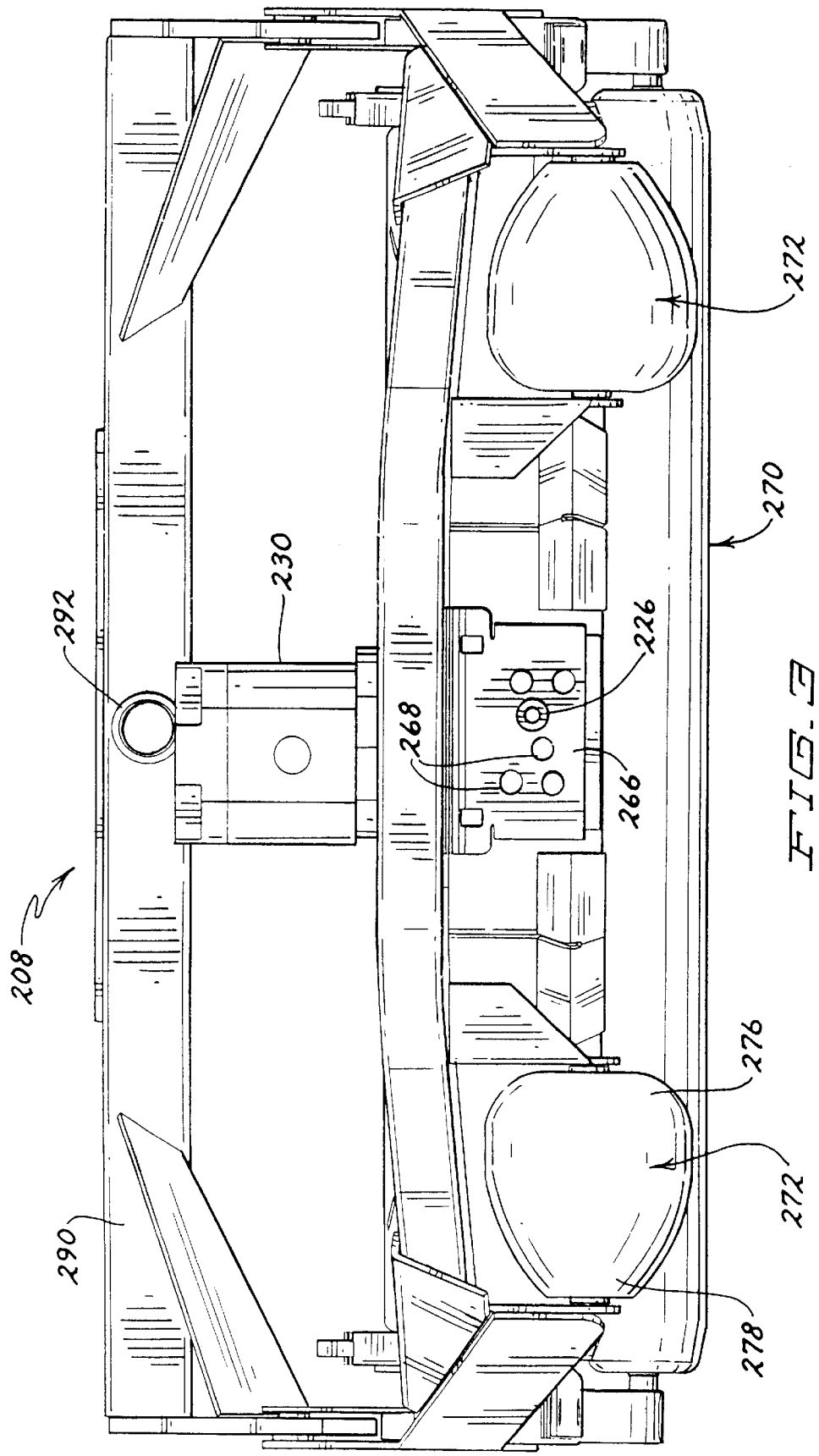
FIG. 3 is a front elevational view of the rotary cutting unit shown in FIG. 2.
Figure 4:
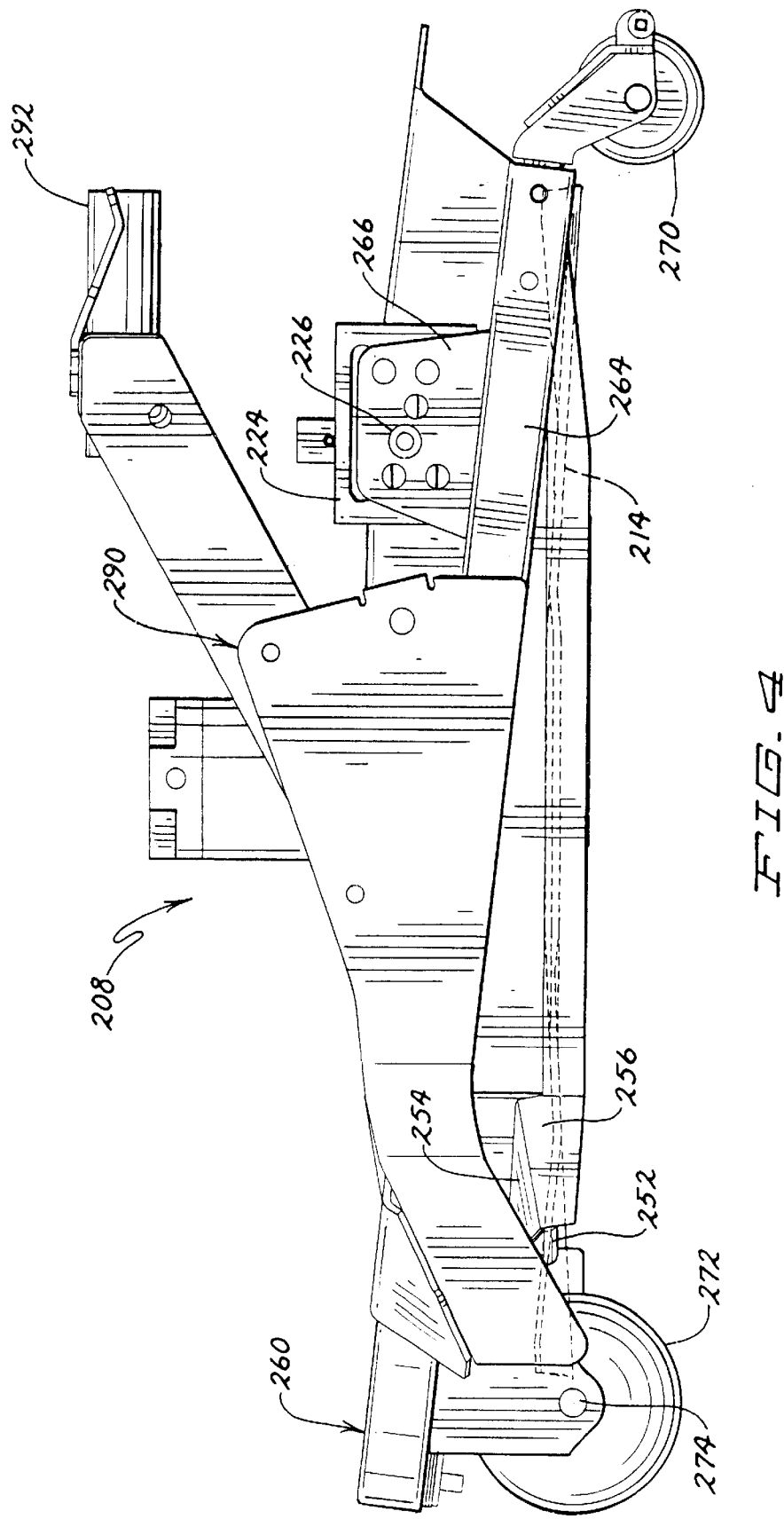
FIG. 4 is a side elevational view of the rotary cutting unit shown in FIG. 2.
Figure 5:
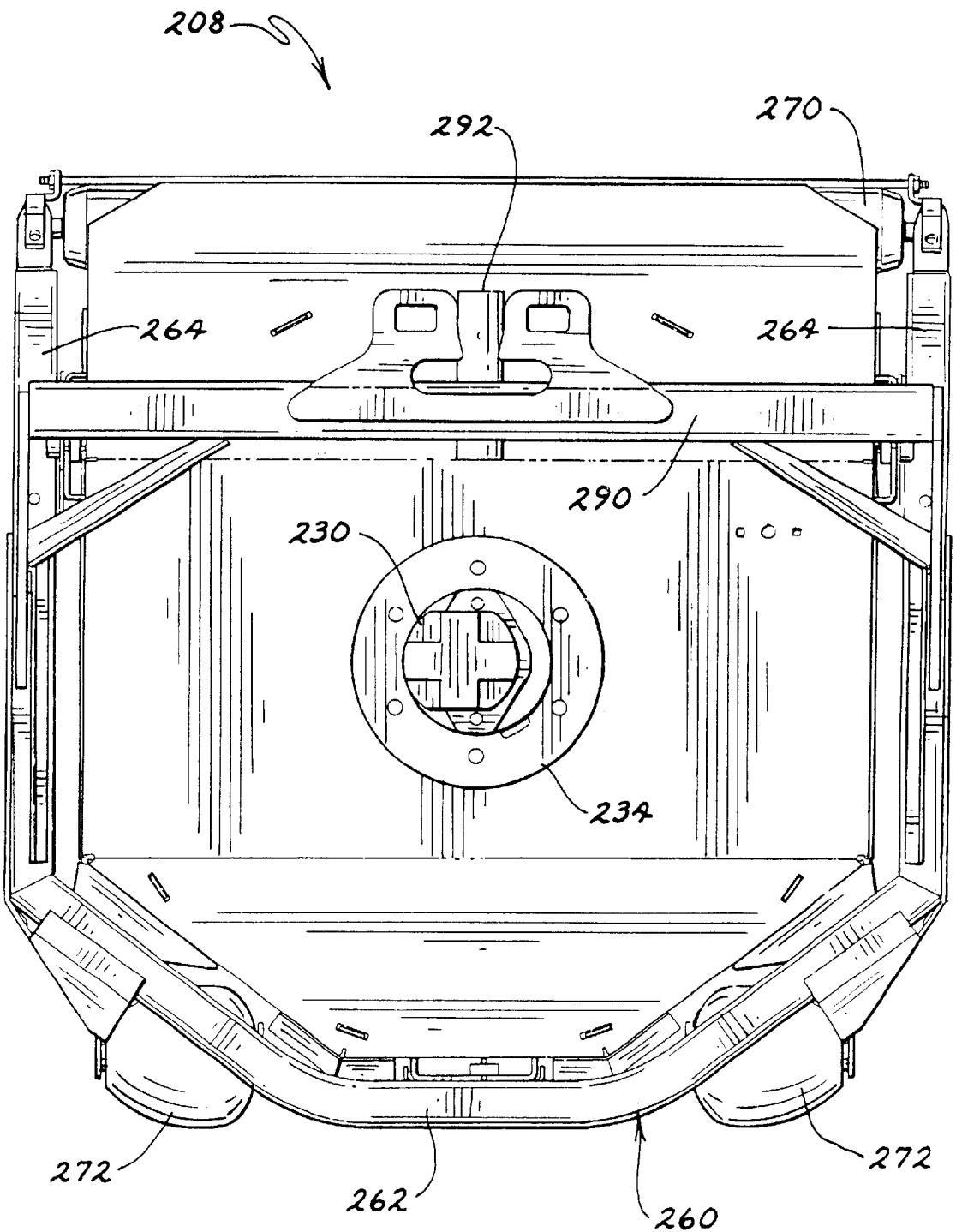
FIG. 5 is a top plan view of the rotary cutting unit shown in FIG. 2.

A mower according to this invention is generally illustrated as 100 in FIG. 1. Mower 100 includes a traction vehicle 102 having a pair of front drive wheels 104 appropriately coupled through a transmission (not shown) to a prime mover (also not shown). A rear steerable wheel 106, which may or may not be powered, support the rear end of vehicle 102. An operator who sits in an operator's seat 114 can steer traction vehicle 102 by means of a steering wheel 116 which, when turned, causes rear wheel 106 to pivot about a vertical axis, thereby steering the vehicle.

The Toro Company, the assignee of this invention, makes and sells a well known triplex trim mower of the type shown herein known as the Sidewinder® which carries three reel-type cutting units thereon. The cutting swath formed by these reel-type cutting units can be laterally displaced relative to the vehicle 102 using a cutting unit carrier system shown generally as 141. The operator can selectively laterally displace the cutting units to one side or the other using a joystick 118. When joystick 118 is laterally moved from its neutral position, it actuates a hydraulic cylinder 158 that acts through a scissors frame 146 on a laterally slidable carrier frame 144 to slide carrier frame 144 to one side or the other from a normal, generally centered orientation. The cutting units are attached to carrier frame 144 so that all of the cutting units are displaced with carrier frame 144 to similarly laterally displace the swath of grass being cut by the cutting units relative to the traction vehicle 102.

The Sidewinder® trim mower described above, in addition to being commercially available, is also shown and described in U.S. patent application Ser. No. 08/969,799, filed Nov. 13, 1997, which application is hereby incorporated by reference.

The rotary cutting units 208 of this invention are shown installed on a mower 100 comprising a Sidewinder® trim mower. In this embodiment, the three reel type cutting units present on a Sidewinder® trim mower are replaced by three rotary cutting units 208. The system for laterally displacing rotary cutting units 208 is the same as the system used in the Sidewinder® trim mower to laterally displace the three reel type cutting units. Namely, all three rotary cutting units 208 can be displaced to one side or the other from a normal, generally centered orientation on vehicle 102 using the same cutting unit carrier system 141 present on a Sidewinder° trim mower. The primary difference between the Sidewinder® trim mower equipped with reel-type cutting units and the mower 100 according to this invention is the nature of the cutting units themselves, namely the use of the rotary cutting units 208 disclosed herein rather than reel type cutting units.

A rotary cutting unit 208 of the type according to this invention is shown in FIGS. 1–9 and will be more fully described hereafter. The description of one rotary cutting unit 208 will serve to describe the other rotary cutting units 208 as all of the cutting units are generally identical. Again, since one rotary cutting unit 208 will replace each of the reel-type cutting units normally found in a Sidewinder® trim mower, there will be two front rotary cutting units 208a in advance of each front wheel 104 of vehicle 102. A third, rear cutting unit 208b will be placed beneath vehicle 102 generally between the front and rear wheels of vehicle 102. The rear cutting unit 208b will extend between and cover the gap that exists between the front cutting units 208a such that all three cutting units 208a and 208b will cut an unbroken swath of grass. Again, this staggered and overlapped orientation of rotary cutting units 208 is the same as what exists for the reel type cutting units normally found in a Sidewinder® trim mower, except that now the cutting units are rotary cutting units.

Each rotary cutting unit 208 comprises two major components that are normally fixed together during operation of the cutting unit, but are detachable from one another to change the cutting height. The first of these components comprises a cutting deck 210 which provides a cutting chamber 212 in which a generally horizontal cutting blade 214 is contained. Cutting deck 210 also mounts a motive means for rotating blade 214 in a substantially horizontal cutting plane. The other of these components includes a roller frame 216 that mounts various ground engaging rollers. When roller frame 216 is fixed to cutting deck 210, cutting deck 210 is self-supporting on the ground and can roll over the ground by virtue of the various rollers on roller frame 216. The height of cut of rotary cutting unit 208 can be adjusted by changing or adjusting the position of roller frame 216 relative to cutting deck 210 when the two are affixed together.

Cutting deck 210 of each rotary cutting unit includes a downwardly facing cutting chamber 212 which is defined by a circular shroud wall 220 that extends downwardly from a top wall 222. As is well known in rotary cutting decks, this wall arrangement provides a generally enclosed cutting chamber 212 which is enclosed over the sides and top thereof but is open at the bottom thereof. A rotary cutting blade 214 is carried inside this cutting chamber 212 and rotates in a generally horizontal cutting plane about a generally vertical rotational axis. Cutting blade 214 has sharpened cutting edges which cut the grass as blade 214 rotates in its cutting plane. The height of cut is determined by how far blade 214 is positioned above the ground which is, in turn, determined by the relative position of cutting deck 210 on roller frame 216.

The circular shroud wall 220 of cutting deck 210 can be generally continuous and unbroken so that cutting deck 210 acts as a mulching deck. In other words, grass clippings within cutting chamber 212 will exit the chamber only through the open bottom of cutting chamber 212. However, shroud wall 220 could also be provided with a grass discharge opening to allow grass clippings to exit through shroud wall 220 in some desired direction, i.e. to the side of cutting deck 210 or preferably to the rear of cutting deck 210. Thus, whether cutting deck 210 is a mulching deck or a side or rear discharge deck is not important to this invention.

In addition, cutting deck 210 can have other walls secured to shroud wall 220 for various purposes. For example, the front and sides of cutting deck 210 are desirably flat to carry slotted attachment brackets 224 that are adjustably mated to attachment pins 226 on roller frame 216. The flat front and sides of cutting deck 210 are provided by other straight, flat walls 228 that are secured to the front and sides of circular shroud wall 220. See FIG. 8. In addition, top wall 222 extends rearwardly past circular shroud wall 220 to further unite and join the straight, flat walls 228 that are secured to the sides of circular shroud wall 220.

A means for rotating the cutting blade within cutting chamber 212 is provided on cutting deck 210. This rotating means comprises an individual electric or hydraulic motor 230. Preferably, cutting deck 210 includes a series of bolt holes 232 to which a motor mounting ring 234 can be bolted. When so mounted and when energized, the shaft of motor 230 is suitably connected to blade 214 to rotate blade 214 in its horizontal cutting plane. Alternatively, the blade rotating means could comprise a drive spindle mounted on cutting deck 210 that could be belt driven from a power takeoff shaft or the like. However, since rotary cutting unit 208 is free to pivot and tilt during operation of the mower to conform to the ground contours in the same manner that the reel-type cutting units can pivot and tilt on a Sidewinder® trim mower, the use of a belt driven spindle as the blade rotating means is not preferred due to the problems involved in keeping proper tension and alignment on the belt. These problems are avoided by using an electric or hydraulic motor 230 as the blade rotating means.

Figure 6:
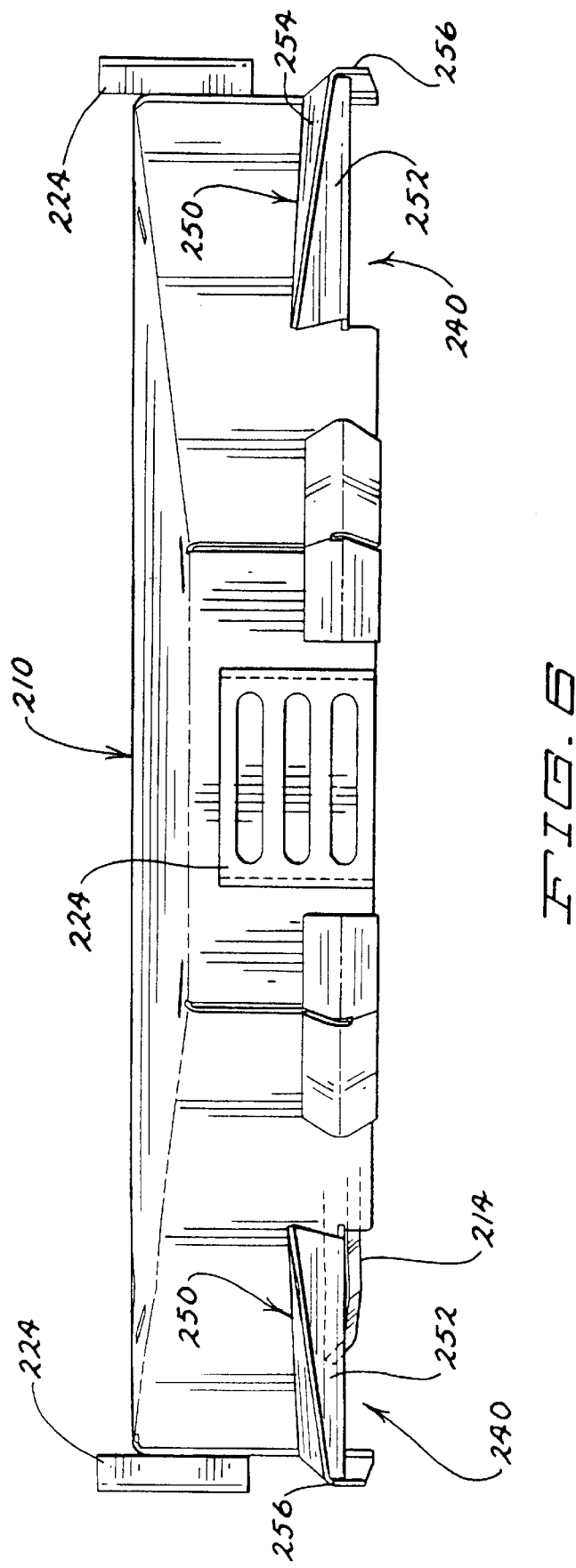
FIG. 6 is a front elevational view of a portion of the cutting unit shown in FIG. 2, namely a front elevational view of the cutting deck with the roller frame having been detached from the cutting deck such that the cutting deck is illustrated by itself.
Figure 7:
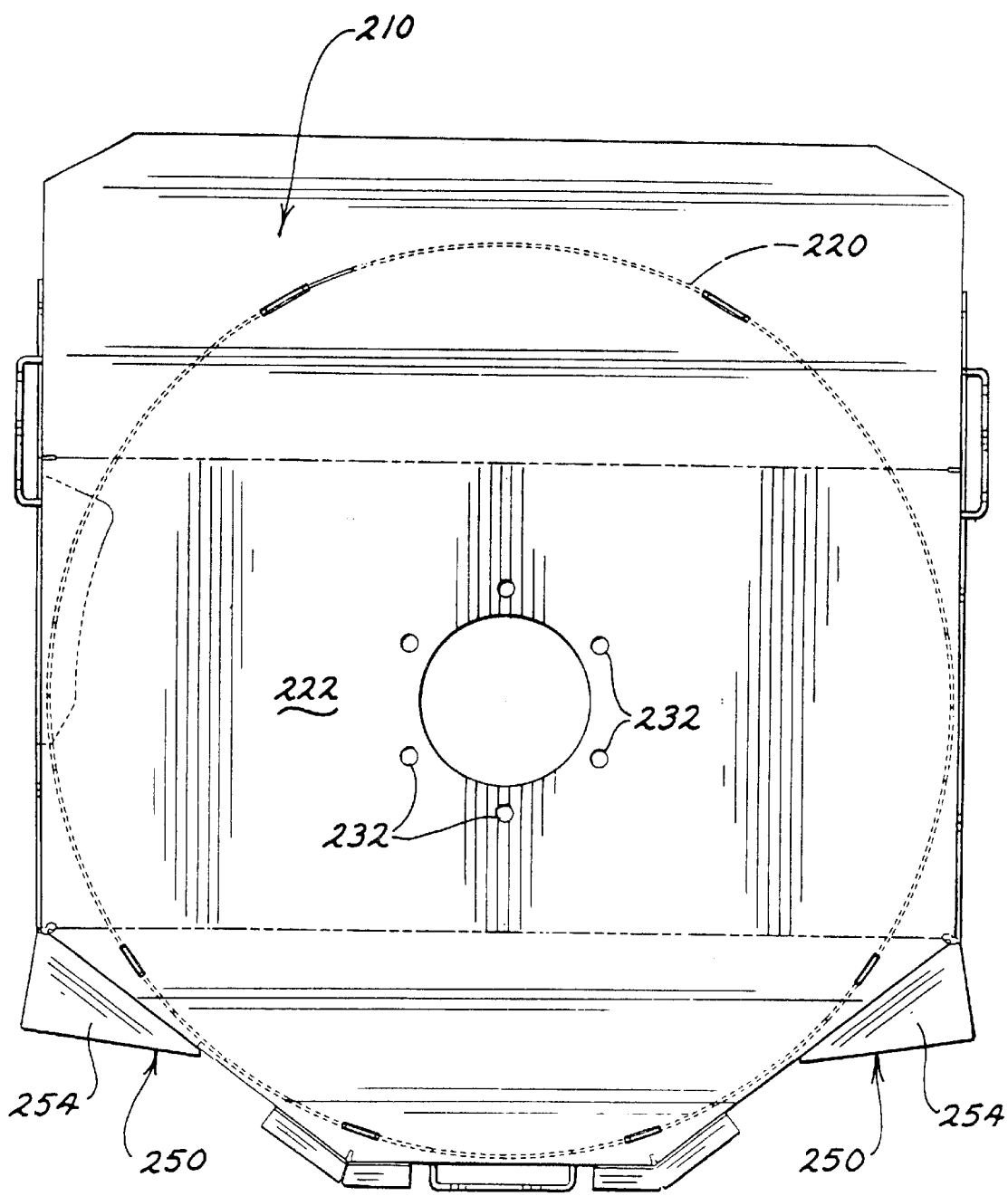
FIG. 7 is a top plan view of the cutting deck portion, shown in FIG. 6, of the cutting unit.
Figure 8:
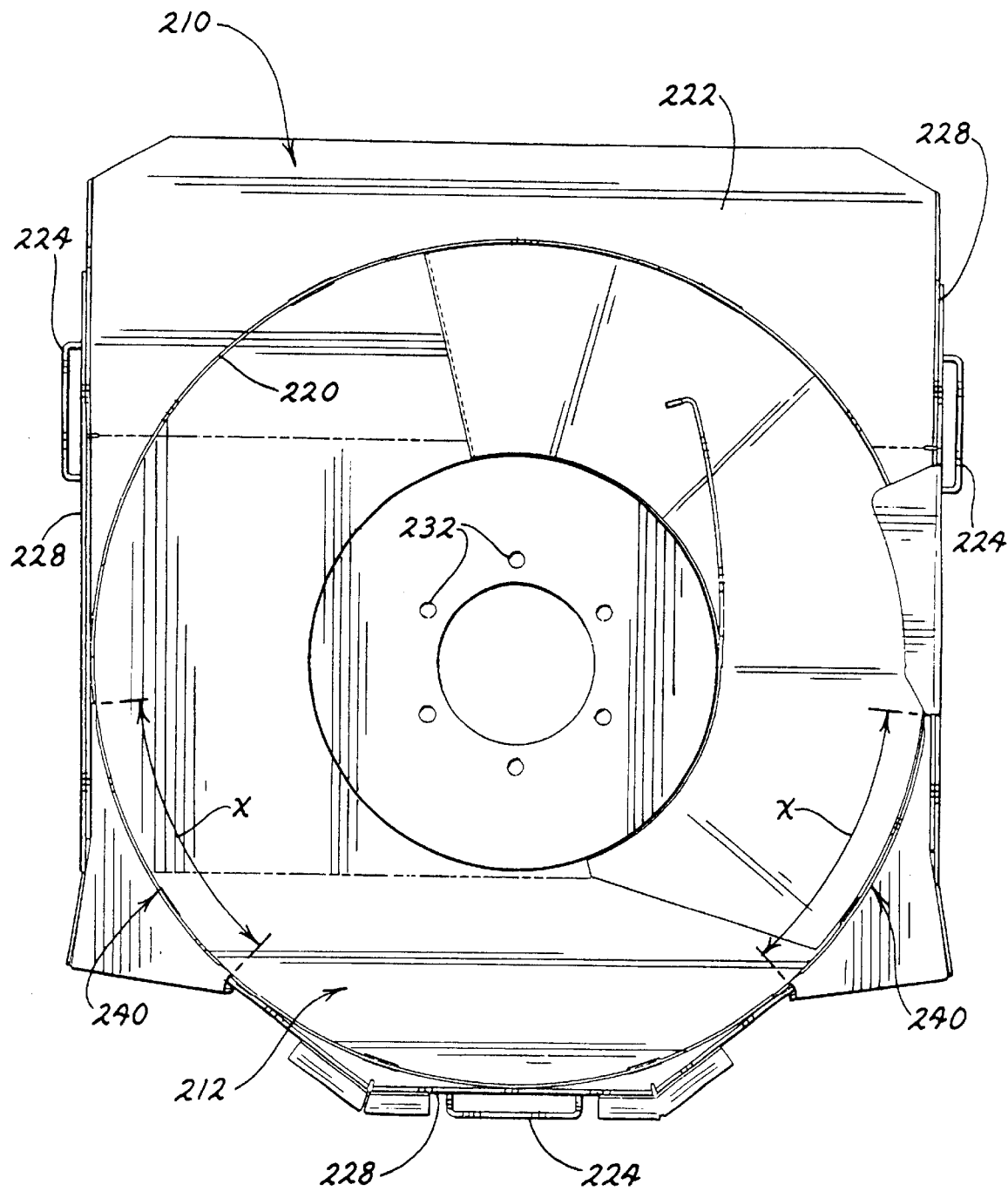
FIG. 8 is a bottom plan view of the cutting deck portion, shown in FIG. 6, of the cutting unit.

Shroud wall 220 of the rotary cutting deck has a cutout 240 adjacent each front corner of cutting deck 210. By a cut-out, it is meant that shroud wall 220 is cut away adjacent its lower edge to expose the sharpened cutting edge of blade 214 when the tip of blade 214 travels past cut-out 240. Referring now to FIG. 8, each cut-out 240 has an angular extent of about 45° designated by the arc labelled as x and is positioned on the front corner of cutting deck 210 so that uncut, standing grass approaching each front corner of cutting deck 210 will encounter or pass into one of cut-outs 240. As shown in FIGS. 6 and 8, blade 214 is exposed to the uncut grass in cut-out 240. Otherwise, in the front of cutting deck 210 between cut-outs 240, blade 214 is hidden or enclosed by the walls which define the front of cutting deck 210.

Cutting deck 210 includes baffles 250 adjacent each of the front corner cut-outs 240 for helping guide standing, uncut grass into cut-outs 240. Each baffle 250 comprises a generally upright, triangular, first baffle surface 252 that is widest at the innermost portion of cut-out 240 and decreases in height towards the outside of cutting deck 210. This upright, triangular, first baffle surface 252 is secured to the sides of cutting deck 210 by an upper triangular support flange 254 having an outermost, vertical side 256 that wraps down over the outermost end of the triangular, first baffle surface 252. The outermost, vertical side 256 of the triangular support flange 254 extends rearwardly to join with the side walls of cutting deck 210. The outermost side 256 of the triangular support flange 254 is beneath the level of blade 214 and of the bottom of the triangular, first baffle surface 252. See FIG. 6.

Thus, referring again to FIG. 6 which shows the front of cutting deck 210, as standing, uncut grass engages the front of cutting deck 210, the grass that engages the middle portion of the front of cutting deck will simply be bent beneath the lowermost edge of the walls of the deck in the middle portion. However, the standing, uncut grass that approaches each side of cutting deck 210 will engage the triangular, first baffle surface 252 adjacent each of the front cut-outs 240. This first baffle surface 252 will tend to bend the grass smoothly down into the front cut-out 240 where the grass can stand back up and be cut without being bent to one side of cutting deck 210, the grass being further confined by the outermost side 256 of the triangular support flange 254.

When rotary cutting decks 208 are arranged in a staggered orientation as in the mower of this invention, the Applicant has sometimes noticed a streaking effect along the lines where the rear cutting deck overlaps with the front cutting deck. This streaking effect is especially prevalent when vehicle 102 is turning or traversing slopes. However, when cutting decks 210 are equipped with the front corner cut-outs 240 and adjacent baffles 250 as described and illustrated herein, streaking occurring between cutting decks 210 is substantially eliminated or reduced.

As noted earlier, cutting deck 210 by itself comprises only one component of rotary cutting unit 208. To form a complete rotary cutting unit 208, cutting deck 210 has to be united with a roller frame 216. Roller frame 216 and its attached rollers will now be described.

Roller frame 216 comprises a generally U-shaped arch 260 defined by a front rail 262 secured to two, rearwardly extending side rails 264. The width of the U-shaped arch 260, i.e. the distance between side rails 264, is wide enough to allow cutting deck 210 to be positioned within roller frame 216. Each rail 262, 264 of the U-shaped arch has an apertured attachment flange 266 that carries a plurality of holes or apertures 268 for receiving an attachment pin 226. Each attachment flange 266 on one of the rails overlies one of the slotted attachment brackets 224 on cutting deck 210 so that pin 226 can pass through a selected aperture 268 and a selected slot to affix roller frame 216 and cutting deck 210 together. The height of cutting deck 210 on roller frame 216 can be adjusted by changing which aperture and which slot receive attachment pin 226. This is how the height of cut of the cutting unit is adjusted. The U-shaped arch 260 includes a single, rotatable ground engaging roller 270 at the rear of side rails 264 behind cutting deck 210 when roller frame 216 and cutting deck 210 are united with respect to one another. This single ground engaging roller 270 extends all the way between side rails 264 over the full width of cutting deck 210. In addition, two, front, ground engaging rollers 272 are used on front rail 262 of arch 260 adjacent each corner of cutting deck 210. These two, front rollers 272 obviously extend over a small portion of the width of cutting deck 210 as opposed to the full length rear roller 270. Rear roller 270 need not necessarily be a full length roller, but could comprise a segmented roller or two separate rollers at each rear corner of the cutting deck including two separate rear rollers shaped like the two, front rollers 272.

The front ground engaging rollers 272 have a novel ovate shape with the rotational axis 274 of roller 272 extending transversely relative to cutting deck 210 and being arranged horizontally. The broader basal end 276 of the ovately shaped roller 272 is positioned to the interior of cutting deck 210 and the tapered outer end 278 of the ovately shaped roller 272 is positioned to the exterior of cutting deck 210. Roller 272 is rotatably arranged on front rail 262 of the U-shaped arch in any suitable manner.

The Applicant has found that the front ground engaging rollers 272 have numerous advantages. They are effective replacements for the traditional caster wheels that are often found on the front side of rotary cutting decks. However, front ground engaging rollers 272 are superior to caster wheels since they can be mounted closer to the front wall of cutting deck 210 than caster wheels. This reduces the distance between blade 214 and the support provided by front rollers 272 to minimize scalping and the like and to provide better ground contour following.

One possible disadvantage of using a front ground engaging roller 272 in place of a caster wheel is the tendency of such a roller to slide on the turf during a vehicle turn, which does not happen with a caster wheel that can freely pivot about a vertical axis. Such sliding is a disadvantage as it can mar or scuff the turf. However, the Applicant has found that the ovate shape of the front ground engaging rollers is effective in reducing marring or scuffing during turns. Put another way, the ovate shape of rollers 272 allows cutting deck 210 to smoothly slide over the turf during turns of vehicle 102 without marring or scuffing the turf.

The ovate shape of rollers 272 would also be useful on reel-type cutting units in place of a conventional full length front roller. In other words, such ovate rollers 272 would reduce marring and scuffing of the turf in a non-steerable reel-type cutting unit in the same manner as they do for the rotary cutting units 208 disclosed herein.

In addition to the U-shaped arch 260 that mounts the front and rear ground engaging rollers 272 and 270, respectively, roller frame 216 includes a yoke 290 secured to side rails 264 of the arch. This yoke 290, and particularly an elongated rod 292 on the yoke, is how rotary cutting unit 208 is attached to the cutting unit carrier system 141. Each rod 292 slips into one of the stem pivots 136 in the same manner as the reel-type cutting units on a Sidewinder® trim mower.

Rotary cutting units 208 have been shown herein installed on a riding mower platform comprising a Sidewinder® trim mower. However, rotary cutting units 208 are not limited to use in a Sidewinder® trim mower in which the cutting units 208 can be laterally displaced, but could be used as part of other riding mowers. For example, a cutting unit 208 having the disclosed ovately shaped, front, ground engaging rollers 272 would be useful in other riding mower applications. A cutting unit 208 with front corner cut-outs 240 would be useful in eliminating streaking between multiple cutting units even if the cutting units did not shift or were arranged in a different staggered pattern. This would also be true whether three cutting units 208 are arranged in the triplex configuration shown in FIG. 1, or five cutting units are arranged in a five-plex configuration as in the Ransomes AR 250 mower, or more cutting units are arranged in some different configuration.

In addition, various other modifications will be apparent to those skilled in the art. For example, the bolt holes 232 provided in cutting deck 210 for bolting the motor and blade combination to the deck in a single position could be replaced with slots (not shown) that are elongated in a fore and aft direction relative to the deck. Such slots would allow the position of blade 214 in cutting chamber 212 to be adjusted from a centered position to a non-centered position, i.e. to a position where blade 214 is shifted either forwardly or rearwardly in cutting chamber 212 to provide more clearance at the rear or in the front of cutting chamber 212, respectively. This adjustment would be made by sliding the bolts of the motor mounting ring either forwardly or rearwardly in the slots before the bolts are secured. Shifting the motor/blade combination towards the front allows for more efficient mulching of clippings while shifting the motor/blade combination to the rear provides a much smaller mulched clipping. Thus, the use of the aforementioned slots to allow a fore and aft shifting of the motor/blade combination is useful primarily in cutting decks in which the cutting chamber can be enclosed to mulch the clippings.

Thus, the scope of this invention is to be limited only by the appended claims.

We claim:

1. A mower comprising:
   a. a traction vehicle;
   b. a plurality of cutting units carried on the traction vehicle which cutting units collectively cut a swath of grass as the traction vehicle is operated, wherein the cutting units comprise rotary-type cutting units each having a cutting blade which is rotated in a substantially horizontal cutting plane, wherein the cutting blade has a tip at each end with a sharpened cutting edge on each blade tip;
   c. wherein each cutting unit includes a cutting deck having a substantially circular shroud wall that extends vertically downwardly from a top wall to form a substantially circular, downwardly facing cutting chamber, wherein the cutting blade rotates within the cutting chamber without having the blade tips radially extend outside of the shroud wall of the cutting chamber and with the blade tips remaining at all times beneath the top wall of the cutting chamber;
   d. wherein each cutting unit includes a plurality of rotatable ground engaging members that allow the cutting unit to roll over the ground during movement of the traction vehicle;
   e. wherein each cutting deck has a front side that is forwardmost taken with respect to forward motion of the traction vehicle with the front side of the cutting deck having a pair of laterally spaced front corners comprising a left front corner and a right front corner; and
   f. wherein the cutting deck has a pair of front corner cut-outs comprising a left front corner cut-out located at the left front corner of the cutting deck and a right front corner cut-out located at the right front corner of the cutting deck, wherein each front corner cut-out is formed by a cut away portion of a lower edge of the shroud wall, the cut away portion extending high enough up the shroud wall such that an upper edge of the cut away portion is located below the top wall of the cutting deck but above the sharpened cutting edges on the blade tips so that uncut grass can more easily enter the cutting chamber through each front cut-out to be cut by the blade.

2. The mower of claim 1, wherein each cutting deck further includes a pair of laterally extending baffles adjacent the front corner cut-outs, wherein each baffle is carried on the cutting deck substantially immediately ahead of and above one of the front corner cut-outs.

3. The mower of claim 2, wherein the plurality of ground engaging members comprise a pair of front ground engaging members located on the forwardmost side of the cutting deck, wherein each front ground engaging member is located adjacent one of the front corners of the cutting deck with one of the laterally extending baffles located between each front ground engaging member and one of the front corner cut-outs.

4. The mower of claim 3, wherein each front ground engaging member comprises a roller.

5. The mower of claim 2, wherein each baffle includes a first, generally upright, baffle surface having a lower edge that is located approximately at the level of the upper edge of the cut away portion that forms the cut-out with the first baffle surface extending upwardly relative to the cut-out such that longer uncut grass engaging against the first upright baffle surface is bent down by the first baffle surface into the cut-out.

6. The mower of claim 5, wherein the first baffle surface is inclined forwardly as it extends upwardly.

7. The mower of claim 5, wherein the first baffle surface has an upper edge located below the top wall of the cutting deck.

8. The mower of claim 7, wherein the first baffle surface has a progressively tapering height between the upper and lower edges of the first baffle surface, the first baffle surface decreasing in height as one proceeds laterally outwardly along the first baffle.

9. The mower of claim 7, further including a generally horizontal support flange extending between the upper edge of the first baffle surface and adjacent portions of the cutting deck to attach the first baffle surface to the cutting deck.

10. The mower of claim 9, wherein the support flange has an outermost vertical side that wraps down over an outermost end of the first baffle surface.

11. The mower of claim 10, wherein the outermost vertical side of the support flange extends below the lower edge of the first baffle surface to further help guide confine uncut grass and guide uncut grass into the front corner cut-out.

12. The mower of claim 1, wherein each front corner cut-out has an angular extent of approximately 45°.

13. The mower of claim 1, wherein the cutting units comprise:
   a. at least two cutting units carried on the traction vehicle with the first and second cutting units being longitudinally aligned with one another but being laterally spaced from one another to have a gap therebetween; and
   b. at least one additional cutting unit carried on the traction vehicle which is longitudinally spaced from the first and second cutting units and is located relative to the first and second cutting units to cover the gap between the first and second cutting units.

* * * * *